United States Patent
Kiyama et al.

(10) Patent No.: US 8,306,405 B2
(45) Date of Patent: Nov. 6, 2012

(54) DATA RECORDING METHOD, DATA EDITING METHOD, DATA DECODING METHOD, AND APPARATUS AND RECORDING MEDIUM THEREFOR

(75) Inventors: Jiro Kiyama, Funabashi (JP); Yuri Iwano, Chiba (JP); Takayoshi Yamaguchi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1189 days.

(21) Appl. No.: 11/979,181

(22) Filed: Oct. 31, 2007

(65) Prior Publication Data

US 2008/0137730 A1 Jun. 12, 2008

Related U.S. Application Data

(63) Continuation of application No. 10/481,002, filed on Dec. 15, 2003, now Pat. No. 7,653,285.

(30) Foreign Application Priority Data

Jun. 15, 2001 (JP) ................................ 2001-180952

(51) Int. Cl.
*H04N 5/93* (2006.01)
*H04N 5/917* (2006.01)
*H04N 5/78* (2006.01)
*G11B 27/00* (2006.01)
*H04N 5/783* (2006.01)
*H04N 5/89* (2006.01)
*H04N 5/84* (2006.01)

(52) U.S. Cl. ........ 386/353; 386/325; 386/343; 386/349; 386/278; 386/332; 386/334; 386/329

(58) Field of Classification Search .................. 386/325, 386/343, 349, 353, 278, 332, 334, 329
See application file for complete search history.

(56) References Cited

U.S. PATENT DOCUMENTS

| | | | |
|---|---|---|---|
| 5,802,239 A | 9/1998 | Fujinami | |
| 5,841,740 A | 11/1998 | Fijita et al. | |
| 5,999,698 A | 12/1999 | Nakai et al. | |
| 6,078,727 A | 6/2000 | Saeki et al. | |
| 6,134,243 A | 10/2000 | Jones et al. | |

(Continued)

FOREIGN PATENT DOCUMENTS

EP    1 089 278 A2    4/2001

(Continued)

OTHER PUBLICATIONS

European Search Report dated Jun. 7, 2010, issued on the corresponding European Patent Application No. 10 15 8540.4.

(Continued)

*Primary Examiner* — Daquan Zhao
(74) *Attorney, Agent, or Firm* — Edwards Wildman Palmer LLP; David G. Conlin; Stephen D. LeBarron

(57) ABSTRACT

A system records an AV stream composed of a plurality of record units (RUs) containing independently reproducible video units (VUs) of at least video or audio and program information (Movie atom) managing the AV stream, onto a recording medium. The program information contains a piece of information (Edit list atom) that manages a point of junction between the record units or between AV streams. In decoding the AV stream, decoding is halted or decoders are switched at the point of junction, based on the management information on the points of junction, for example.

2 Claims, 19 Drawing Sheets

U.S. PATENT DOCUMENTS

| | | | |
|---|---|---|---|
| 6,137,946 A | 10/2000 | Ando | |
| 6,269,063 B1 | 7/2001 | Fujinami et al. | |
| 6,580,872 B1 | 6/2003 | Kikuchi et al. | |
| 7,027,717 B1 | 4/2006 | Tsujii et al. | |
| 7,577,970 B2 * | 8/2009 | Jarman | 725/25 |
| 2002/0145702 A1 | 10/2002 | Kato et al. | |

FOREIGN PATENT DOCUMENTS

| | | |
|---|---|---|
| EP | 1 126 454 A1 | 8/2001 |
| JP | 08-063867 | 3/1996 |
| JP | 08-251582 A | 9/1996 |
| JP | 08-287602 | 11/1996 |
| JP | 09-182024 A | 7/1997 |
| JP | 11-096730 | 4/1999 |
| JP | 11-317014 A | 11/1999 |
| JP | 2000-023099 | 1/2000 |
| JP | 2000-175134 A | 6/2000 |
| JP | 2000-232625 | 8/2000 |
| JP | 2000224523 | 8/2000 |
| JP | 2000-287172 | 10/2000 |
| JP | 2001-094933 | 4/2001 |
| JP | 2001-101790 | 4/2001 |
| JP | 2001-103477 | 4/2001 |
| JP | 2001-157161 | 6/2001 |
| JP | 2002-158974 | 5/2002 |
| WO | WO-00/18117 | 3/2000 |
| WO | WO-00/30112 | 5/2000 |
| WO | WO-01/04893 A1 | 1/2001 |
| WO | WO-01/39502 A1 | 5/2001 |

OTHER PUBLICATIONS

European Search Report dated Jun. 7, 2010, issued on the corresponding European Patent Application No. 10 15 8542.0.
European Search Report dated Jun. 7, 2010, issued on the corresponding European Patent Application No. 10 15 8543.8.
European Search Report dated Jun. 7, 2010, issued on the corresponding European Patent Application No. 10 15 8546.1.
Chinese Office Action (and English translation) dated Sep. 30, 2005.
Decision of Refusal (and English translation).
Notification of Reason(s) for Refusal (and English translation).

* cited by examiner

FIG. 3

```
Movie atom {
         Atom size
         Type (= 'moov')
         movie header atom
         track atom (video track)
         track atom (main audio track)
                   :
         User-defined data atom
}
```

FIG. 4

```
Track atom {
         Atom size
         Type (= 'trak')
         Track  header  atom
         Edit  atom
         Track  reference  atom
         Media  atom
         User-defined data atom
                   :
}
```

FIG. 5

Track header atom {
        Atom size
        Type (= ' tkhd ' )
        Version
        Flags
        Creation time
        Modification time
        Track ID
        Reserved
        Duration
        Reserved
        Layer
        Alternate group
        Volume
        Reserved
        Matrix structure
        Track width
        Track height
}

FIG. 6

Media atom {
        Atom size
        Type (= ' mdia ' )
        Media header atom
        Handler reference atom
        Media information atom
        User-defined data atom
        :
}

FIG. 7

```
Media information atom {
    Atom size
    Type (= 'minf')
    [Video or Sound or Base] media information header atom
    Handler reference atom
    Data information atom
    Sample table atom
}
```

FIG. 9

```
Sample table atom {
        Atom size
        Type (= 'stbl')
        Sample description atom
        Time-to-sample atom
        Sync sample atom
        Sample-to-chunk atom
        Sample size atom
        Chunk offset atom
}
```

FIG. 10

```
Edit atom  {
        Atom size
        Type (= 'edts')
        Edit list atom
}

Edit list atom {
        Atom size
        Type (= 'elst')
        Versions
        Flags
        Number of entries(=N)
        for  (i = 0; i < N; i++){
                Track duration
                Media time
                Media rate
        }
}
```

FIG. 12

```
User-defined data atom {
        Atom size
        Type (= 'udta')
        for ( i=0; i<N; i++) {
                Atom size
                Type
                User data
        }
}
```

| Entry Number | Track duration D(i) | Media time T(i) | Media rate R(i) |
|---|---|---|---|
| #1 | 10000 | 0 | 1 |
| #2 | 6000 | 10000 | 1 |

FIG. 19

(a) Video track#1

| Entry Number | Track duration D(i) | Media time T(i) | Media rate R(i) |
|---|---|---|---|
| #1 | 10000 | 0 | 1 |
| #2 | 6000 | -1 | 1 |

(b) Video track#2

| Entry Number | Track duration D(i) | Media time T(i) | Media rate R(i) |
|---|---|---|---|
| #1 | 10000 | -1 | 1 |
| #2 | 6000 | 10000 | 1 |

FIG.23
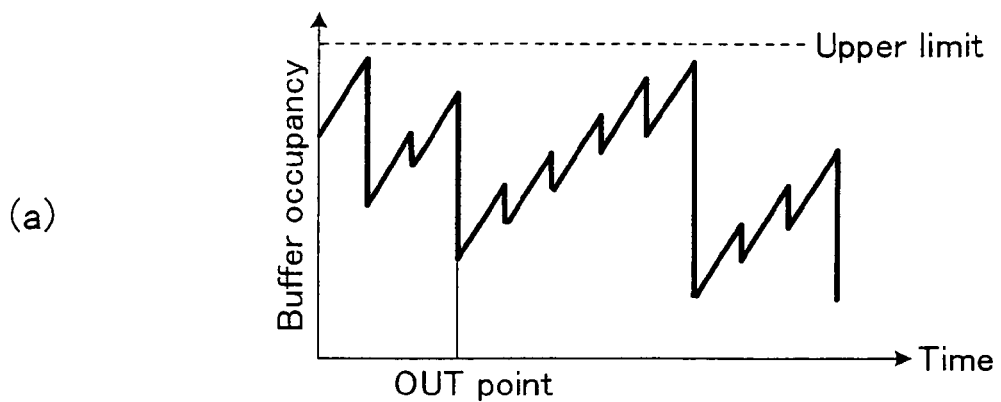
(a)
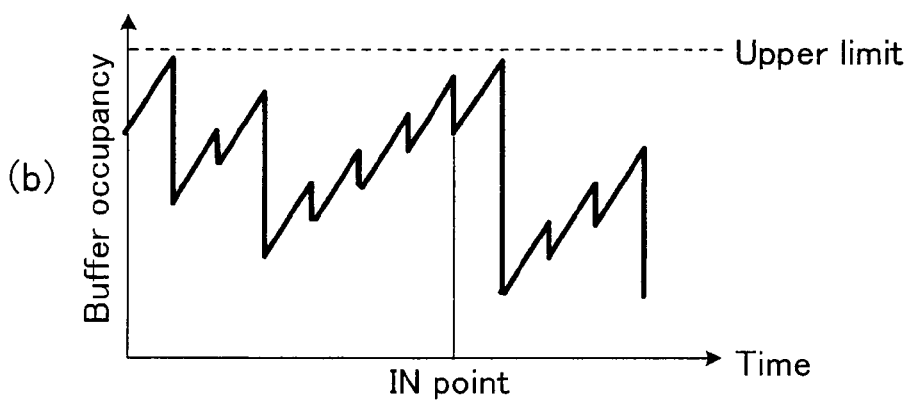
(b)
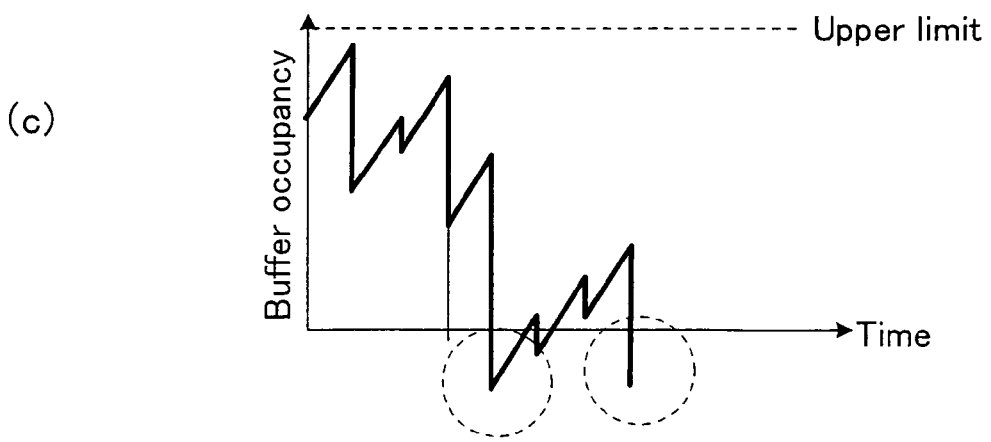
(c)

DATA RECORDING METHOD, DATA EDITING METHOD, DATA DECODING METHOD, AND APPARATUS AND RECORDING MEDIUM THEREFOR

DESCRIPTION

This application is a continuation of application serial No. 10/481,002, filed Dec. 15, 2003.

TECHNICAL FIELD

The present invention relates to a data recording method, a data editing method and a data decoding method and an apparatus therefor, for recording and reproducing data such as video data and audio data to and from a random-accessible recording medium such as a hard disk, optical disk, etc.

BACKGROUND ART

Digital recording and reproducing apparatuses for video and audio using disk media have been coming into wide use. One of the featured functions of disk media, distinct from tape media, is the function of non-destructive editing, or also called the function of non-linear editing. This function is to provide the capability of reproducing any sections of AV streams in a desired order without actual movement or copy of the AV streams recorded on the disk, and this function is achieved by creating information (playback management information) that indicates the start and end of every section to be reproduced in AV streams and their order of reproduction and implementing reproduction following that information.

In this way, with such disk media, it is possible to make an edit without rewriting source material or moving the data. However, there are some cases where the source material needs to be directly edited. For example, suppose the non-destructive edited result is wanted to be brought together into a single file for easy handling by a personal computer (PC). In this case, only that being used in the edited result should be picked out from associated AV streams and united into a single file.

There is also a case where an intermediate part that is unnecessary in an AV stream is wanted to be deleted in order to increase the empty capacity of the disk. In this case, the parts located before and after the intermediate part should be united.

For either case, plural AV streams should be put together. However, there is a concern that some reproduction noise might occur at the seam when a video data encoding scheme based on the MPEG video standard (ISO/IEC 11172-2 or ISO/IEC 13818-2) is adopted.

The reason is as follows. The MPEG video standard adopts variable length coding, and this specifies that encoding of data to be coded at a predetermined rate is implemented such that a model hypothetical decoder called VBV (Video Buffering Verifier) which should be connected to the output from the encoder will not overflow or underflow.

In this model, coded data is supplied to the VBV buffer at a rate not greater than the aforementioned predetermined rate, and the amount of data occupied in the VBV increases at that rate. On the other hand, the moment one frame or field has been decoded, the occupancy of data decreases instantly by the amount of the corresponding coded data.

Any coded data based on MPEG video cannot be assured to be reproduced correctly if the data has not been encoded in such control that the VBV buffer will not overflow or underflow even if the amount of data repeatedly increases and decreases, as shown in FIG. 22. The risk of reproduction noise when some pieces of video data are joined can be attributed to the possibility of the VBV buffer causing overflow or underflow at a point of the seam.

The reason for the collapse of the VBV buffer at the seam will be described referring to an example. Here, description is made of a case where the front part before time OUT of coded video data A having a time-dependent variation in the occupancy of the VBV buffer shown in FIG. 23 (a) and the rear part after time IN of coded video data B shown in FIG. 23 (b) are joined.

FIG. 23 (c) is the joined result. It is understood that in this case the buffer underflows because a frame or field containing a large amount of coded data takes place right after the point of junction regardless of the low buffer occupancy right before the joined point. The reason why an event of this kind happens is that there is a possibility that the conformity of the buffer occupancy is lost.

In order to solve the above problem, Japanese Patent Application Laid-open Hei 9 No. 182024 proposes a technique of preventing underflow by increasing the transfer speed of the input data to the decoder. However, this method needs a special decoder, resulting in cost disadvantage.

As another method, Japanese Patent Application Laid-open Hei 8 No. 251582 proposes a technique (re-coding) whereby the seam portion upon joining is once decoded and then encoded again so that the amount of the coded data will be kept so as not to cause corruption of the VBV buffer. However, in this case, there is a concern of occurrence of image degradation due to the re-coding process. Further this method needs to implement coding and decoding successively or in parallel, entailing the problem in that the apparatus becomes more complicated.

The present invention has been devised in view of the above problems, it is therefore an object of the present invention to provide a data recording method, a data editing method and a data decoding method as well as a data recorder and a data decoder, which, by a simple configuration, can prevent reproduction noise upon reproduction of an AV stream which is formed of joined AV streams.

DISCLOSURE OF INVENTION

The first invention of the present application is a data recording method for recording a second unit composed of a plurality of first units containing first data having at least video or audio and a first program that manages the second unit, onto a recording medium, and is characterized in that the first program contains information that manages a point of junction between the first units.

The second invention of the present application is characterized in that the point of junction is a site where arbitrary pieces of the first data are deleted from the second unit.

The third invention of the present application is characterized in that the second unit is managed by a single file.

The fourth invention of the present application is characterized in that the first data of video is encoded data of the video based on a MPEG standard.

The fifth invention of the present application is a data editing method for producing a second unit by connecting a first unit-containing first data having at least video or audio and a third unit containing second data having at least video or audio and is characterized in that a first program that manages the second unit contains information that manages a point of junction between the first unit and the third unit.

The sixth invention of the present application is characterized in that the first unit and the third unit are formed by deleting arbitrary pieces of the first data from the second unit.

The seventh invention of the present application is characterized in that the second unit is managed by a single file.

The eighth invention of the present application is characterized in that the first and second data of video is encoded data of the video based on a MPEG standard.

The ninth invention of the present application is a data decoding method for decoding a second unit composed of a plurality of first units containing first data having at least video or audio, in accordance with a first program that manages the second unit, and is characterized in that the first program contains information that manages a point of junction between the first units, and decoding of the first units is controlled with reference to the information on the point of junction.

The tenth invention of the present application is characterized in that decoding control of the first units is achieved by halting the decoding at the point of junction.

The eleventh invention of the present application is characterized in that decoding control of the first units is achieved by switching decoders before and after the point of junction.

The twelfth invention of the present application is characterized in that the first and second data of video is encoded data of the video based on a MPEG standard.

The thirteenth invention of the present application is a data recording device for recording a second unit composed of a plurality of first units containing first data having at least video or audio and a first program that manages the second unit, onto a recording medium, and is characterized in that the first program contains information that manages a point of junction between the first units.

The fourteenth invention of the present application is a data editing device for producing a second unit by connecting a first unit containing first data having at least video or audio and a third unit containing second data having at least video or audio, and is characterized in that a first program that manages the second unit contains information that manages a point of junction between the first unit and the third unit.

The fifteenth invention of the present application is a data decoding device for decoding a second unit composed of a plurality of first units containing first data having at least video or audio in accordance with a first program that manages the second unit, and is characterized in that the first program manages information on a point of junction between the first units, and the data decoding device comprising: a decoder for the first units for controlling the decoding based on the information on the point of junction.

BRIEF DESCRIPTION OF DRAWINGS

FIG. 3 is an illustrative view showing the scheme of a Movie atom in the QuickTime file format.

FIG. 4 is an illustrative view showing the scheme of a Track atom in the QuickTime file format.

FIG. 5 is an illustrative view showing the scheme of a Track header atom in the QuickTime file format.

FIG. 6 is an illustrative view showing the scheme of a Media atom in the QuickTime file format.

FIG. 7 is an illustrative view showing the scheme of a Media information atom in the QuickTime file format.

FIG. 9 is an illustrative view showing the scheme of a Sample table atom in the QuickTime file format.

FIG. 10 is an illustrative view showing the scheme of an Edit atom in the QuickTime file format.

FIG. 12 is an illustrative view showing the scheme of a User defined data atom in the QuickTime file format.

FIG. 19 is an illustrative view showing the second example of an information structure that manages the junction of AV streams in the first embodiment of the present invention.

FIG. 23 is an illustrative view showing an example of the junction of MPEG video streams according to the prior art.

BEST MODE FOR CARRYING OUT THE INVENTION

Herein, the embodiments of the present invention will be described in detail with reference to the drawings.

<System Configuration>

Figure 1:
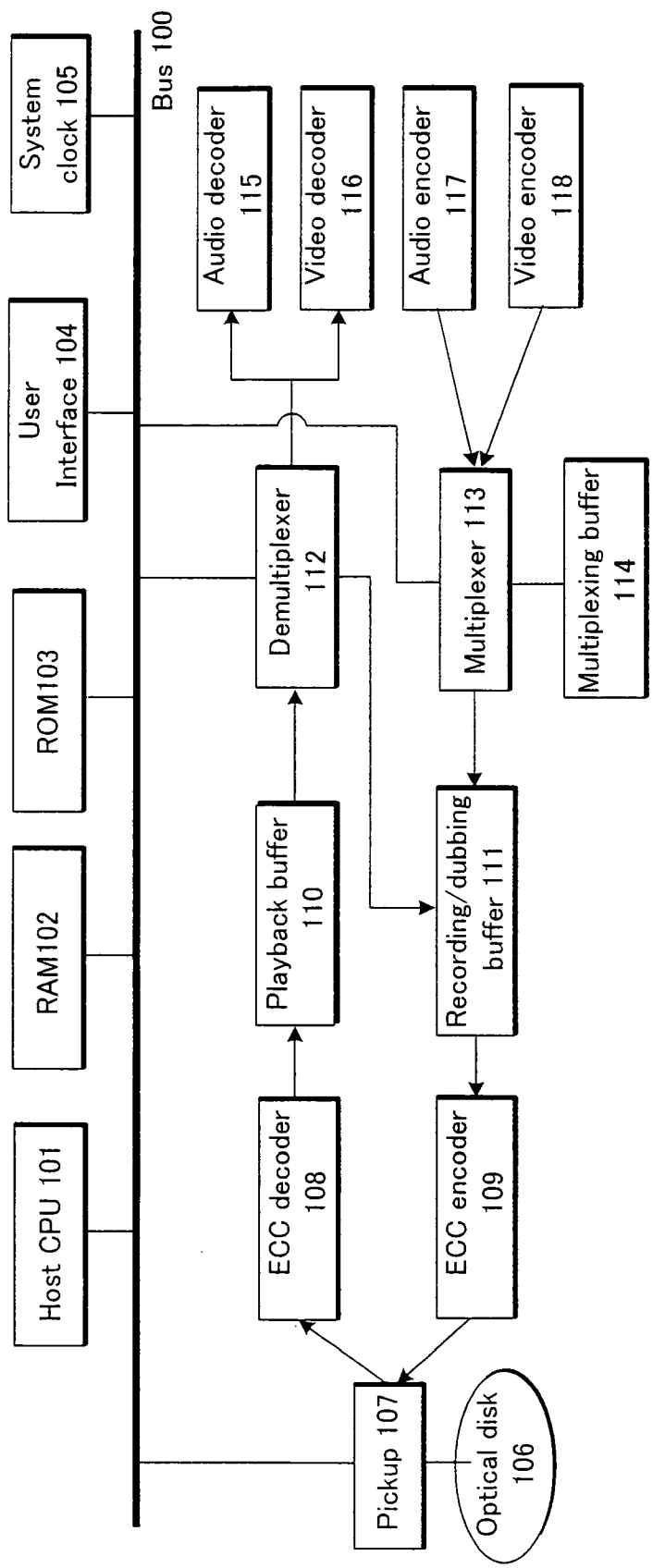
FIG. 1 is a block diagram showing a schematic configuration of a video disk recorder in the embodiment of the present invention.

FIG. 1 shows a configuration of a video disk recorder capable of dubbing, used in common in the embodiments herein. As shown in FIG. 1, this apparatus is comprised of a bus 100, a host CPU 101, RAM 102, ROM 103, a user interface 104, a system clock 105, an optical disk 106, a pickup 107, an ECC decoder 108, an ECC encoder 109, a playback buffer 110, a recording/dubbing buffer 111, a demultiplexer 112, a multiplexer 113, a multiplexing buffer 114, an audio decoder 115, a video decoder 116, an audio encoder 117, a video encoder 118 and unillustrated camera, microphone, speaker, display and the like.

Host CPU 101 communicates through bus 100 with demultiplexer 112, multiplexer 113 and pickup 107 as well as audio decoder 115, video decoder 116, audio encoder 117 and video encoder 118, though not shown.

Upon reproduction, data read out from optical disk 106 by means of pickup 107, is error corrected by ECC decoder 108 and stored temporarily into playback buffer 110. Demultiplexer 112, in accordance with data transmission requests from audio decoder 115 and video decoder 116, distributes the data in the playback buffer to associated decoders depending on the types.

In recording, compression-coded data by audio encoder 117 and video encoder 118 is once sent to multiplexing buffer 114, AV-multiplexed by multiplexer 113 and then sent to recording/dubbing buffer 111. Data in recording/audio dubbing buffer 111 is added with error correction code by ECC encoder 109, then is recorded onto optical disk 106 via pickup 107.

The coding scheme for audio data employs MPEG-1 Layer-II while the coding scheme for video data employs MPEG-2.

The optical disk 106 is assumed to be a removable optical disk which is recorded and played back spirally from the periphery toward the center. One sector is made up of 2048 bytes and sixteen sectors form one ECC block for error correction. If any data in an ECC block needs to be rewritten, it is necessary to read out the whole ECC block containing that data, subject it to error correction, renew the target data, add error correction codes to the data again to reconstruct an ECC block and record it onto the recording medium.

Further, in order to improve the recording efficiency, ZCAV (Zone Constant Angular Velocity) is adopted so the recording area is composed of multiple zones having different rotational rates.

<Filesystem>

A filesystem is used to manage various pieces of information on optical disk 106. As the filesystem here, UDF (Universal Disk Format) is used taking into account joint operation with PCs. On the filesystem, each piece of management information and an AV stream is handled as a file. The user area is managed by logical blocks of 2048 bytes (one to one correspondent with the sectors).

Each file is composed of an integer number of extents (consecutive logical blocks) and can also be dispersed out and stored in extent units. The empty areas are managed in logical block units using Space Bitmap.

The information showing extents, the Space Bitmap, the management information as to the filesystem and the like are recorded on optical disk 106.

<File Format>

As the format for management of AV streams, the QuickTime file format is used. The QuickTime file format was developed as a format for multimedia data management by Apple Computer, Inc., and is widely used in the PC world.

The QuickTime file format is composed of video data, audio data and the like (these are also called media data) and management information. The combination of these two is herein called a QuickTime movie (abbreviated as movie). The two may be present in the same file or in different files.

Figure 2:
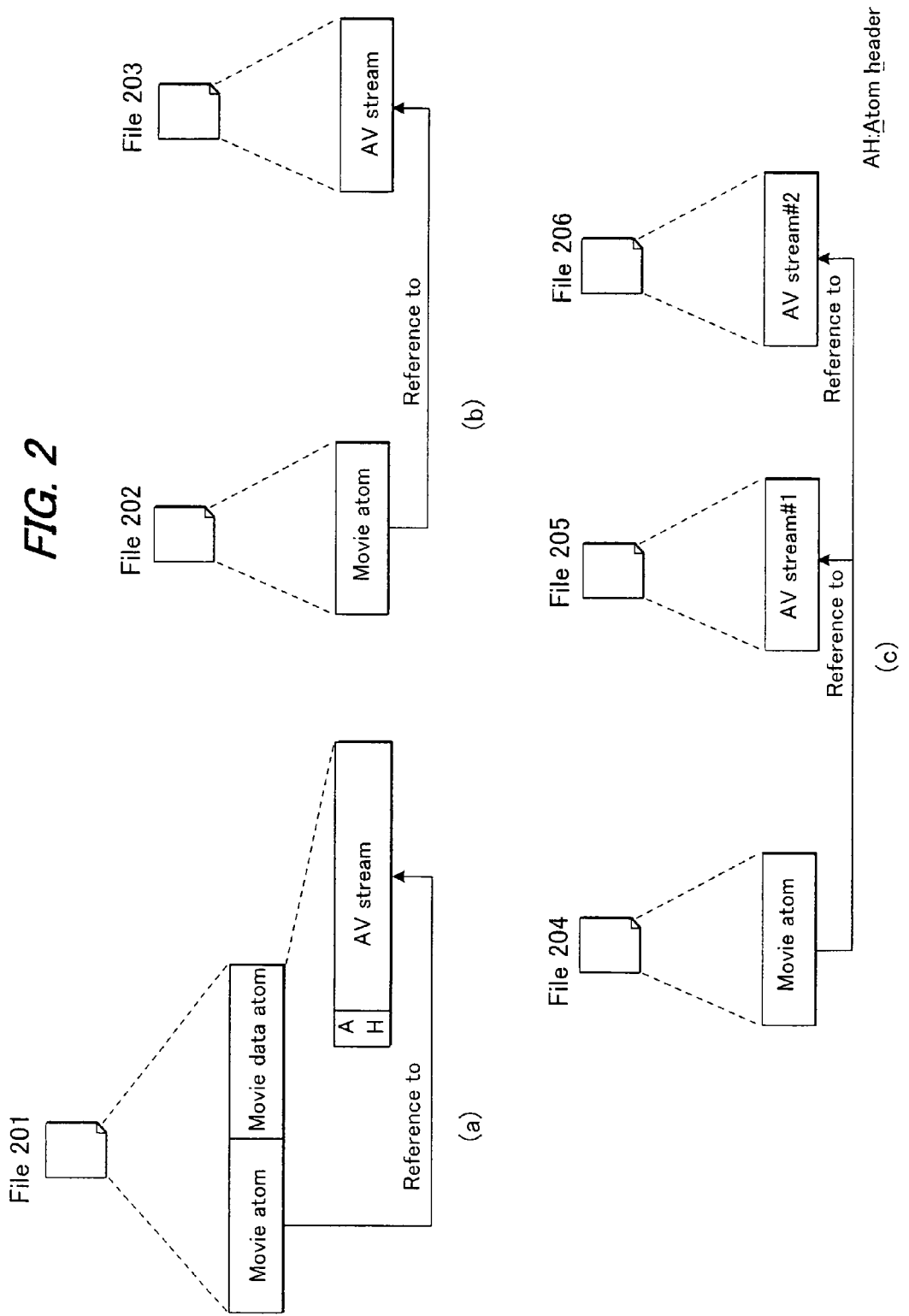
FIG. 2 is an illustrative view showing the relationship between the management information in the QuickTime file format and AV streams.
Figure 8:
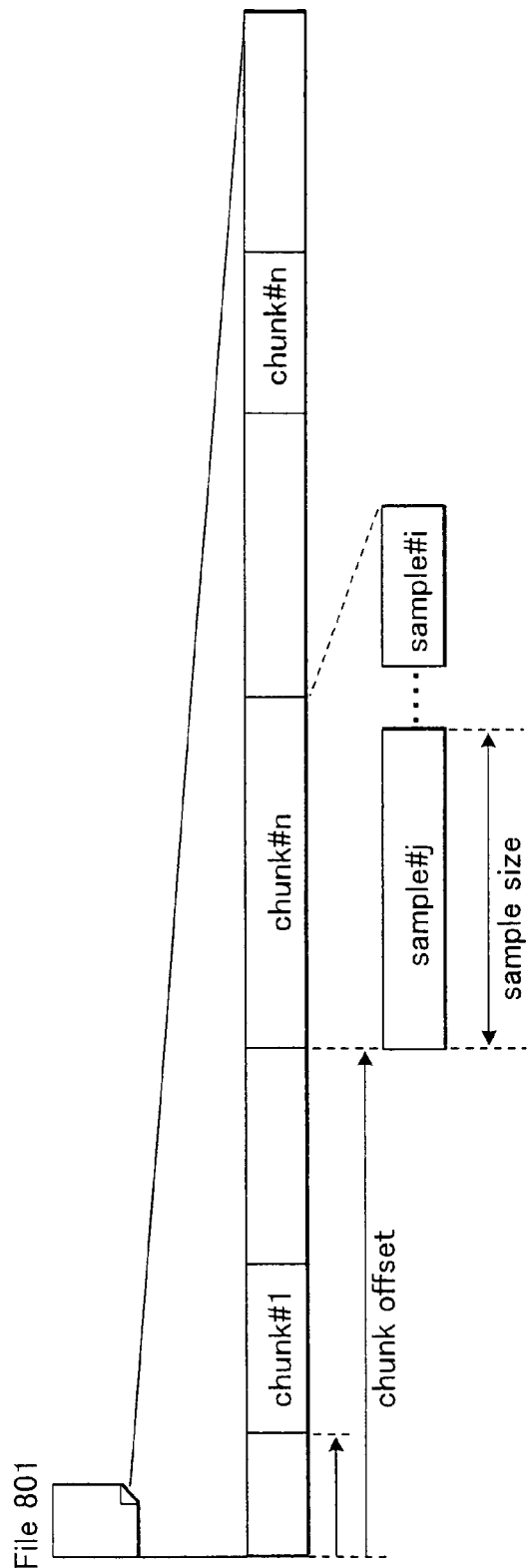
FIG. 8 is an illustrative view showing an example of data management by a Sample table atom.

When present in the same file, they constitute a file 201 shown in FIG. 2(*a*). Each piece of information is stored as a common structure called an atom. The management information is stored as a structure called Movie atom. The AV stream is stored as a structure called Movie data atom.

It should be noted that a Movie atom is a kind of program information for controlling playback of arbitrary sections of media data in an arbitrary order, and includes a table for providing a relative position, in the file, of the AV data that corresponds to an arbitrary time in the media data, the attribute information of the media data, and external reference information, which will be described hereinbelow.

When management information and media data are stored in different files, they constitute a structure of files 202 and 203 shown in FIG. 2(*b*). The management information is stored as a structure called Movie atom while the AV stream is not needed to be stored as an atom. In this situation it is termed that the Movie atom 'externally refers' to file 203 holding the AV stream.

External reference, as shown in FIG. 2(*c*), can be made such that the Movie atom of file 204 can refer to AV stream files #1 and #2 disposed in plural files 205 and 206. This structure enables so called 'non-linear editing' or 'non-destructive editing' which achieves simulated editing without making physical movement of any. AV streams.

Now, the QuickTime management information format will be described with reference to FIGS. 3 to 12. To begin with, the common information storage format, i.e., atom, will be explained. Each atom necessarily includes Atom size that indicates the size of the atom and Type that indicates the type information of the atom at the front thereof. Type is represented with four characters, for example, 'moov' depicts a Movie atom, 'mdat' a Movie data atom.

Each atom can contain another atom. That is, atoms can constitute layered structures. FIG. 3 shows the structure of a Movie atom. A Movie header atom manages the overall attributes of the movie which the Movie atom manages. A Track atom stores the information as to the track of video, audio and the like contained in that movie. A User-defined data atom is an atom which can be defined in a free fashion.

FIG. 4 shows the structure of a Track atom. A Track header atom manages the overall attributes of the track. An Edit atom manages at what timing a section of media data should be reproduced in the movie. A Track reference atom manages the relationship with other tracks. A Media atom manages actual data such as video and audio data.

FIG. 5 shows the structure of a Track header atom. Here, description will be made as to only those needed hereinbelow. 'Flags' is a group of flags indicating attributes. As a typical example, Track enabled flag can be mentioned. If this flag is 1, the track is reproduced while the track is not reproduced if it is 0. Layer indicates the spatial priority of the track. If there are multiple tracks that display images, the smaller the layer value of a track, the more to the foreground the corresponding image is displayed.

FIG. 6 shows the structure of a Media atom. A Media header atom manages the overall attributes etc. as to the media data the Media atom manages. A Handler reference atom stores information that represents which decoder the media data should be decoded by. A Media information atom manages attribute information unique to the media such as video, audio etc.

FIG. 7 shows the structure of a Media information atom. A Media information header atom manages attribute information unique to the media such as video, audio etc. A Handler reference atom is that explained in the Media atom paragraph. Data information atom contains a Data reference atom, which is the atom that manages the names of files containing media data to which the QuickTime movie refers. A Sample table atom manages the size of data, playback time and the like.

Next, a Sample table atom will be described. However, before this description, the data management scheme in QuickTime will be described with reference to a file 801 shown in FIG. 8. In QuickTime, the minimum unit of data (e.g., video frame) is called a sample. In each track, each sample is allotted with a number (sample number) starting from 1, in the order of playback time sequence.

The QuickTime format manages the playback time length and data size of each sample. An area in which samples belonging to the same track is arranged consecutively in a file in the order of playback time sequence is called a chunk. Each chunk is also allotted with a number starting from 1 in the order of playback time sequence.

The QuickTime file format also manages the address of each chunk from the front of the file and the number of samples belonging to each chunk. Based on these pieces of information, it is possible to determine the position of a sample corresponding an arbitrary point of time.

FIG. 9 shows the structure of a Sample table atom. A Sample description atom is a table that manages the data formats of individual chunks, the indexes of files in which samples are stored, and the like. In this table, if samples are stored in different files or if there is difference in data format or in other aspects, such cases are managed by different entries in the table. Here, the entry is a unit of information which is referred to by other information.

A Time-to-sample atom manages the playback time of individual samples. A Sync sample atom manages, among all the samples, those from which decoding can be started. A Sample-to-chunk atom manages the number of samples contained in each chunk and which entry in the Sample description atom each chunk refers to. A Sample size atom manages the size of each sample. A Chunk offset atom manages the address of each chunk from the front of the file.

An Edit atom contains one Edit list atom as shown in FIG. 10. An Edit list atom has groups (entries) of values of Track duration, Media time and Media rate, in an amount that is designated by Number of entries. These entries each correspond to a section that is reproduced consecutively on a track and are arranged on the track in the order of playback time sequence.

Track duration represents the playback time on the track of the section that is managed by the entry; Media time represents the position, in the media data, which corresponds to the front of the section that is managed by the entry; and Media rate represents the reproduction speed of the section that is managed by the entry. When Media time is set at −1, playback of samples on that track is halted by the time indicated by Track duration of that entry. This section is called empty edit.

Figure 11:
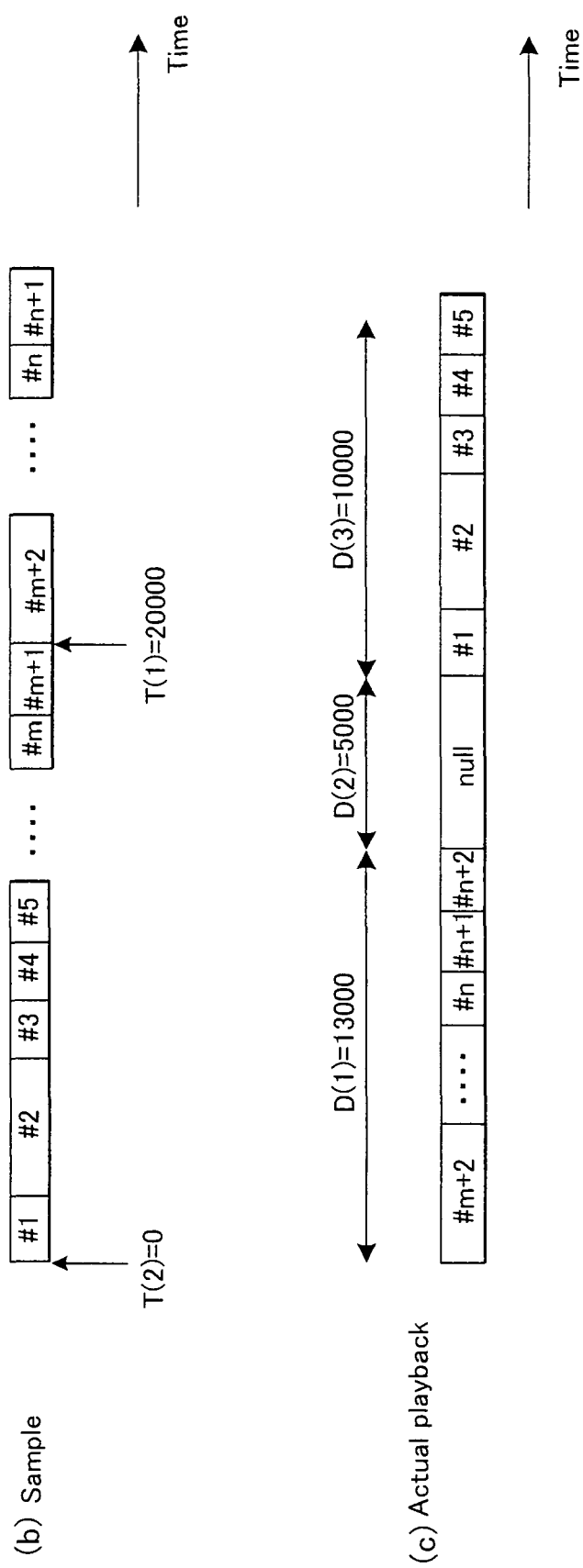
FIG. 11 is an illustrative view showing an example of playback range destination by an Edit atom.

FIG. 11 shows a practical example of Edit list, where it is assumed that Edit list atom has the content shown in FIG. 11(a) and the sample arrangement is as shown in FIG. 11(b). Here, Track duration, Media time and Media rate of the i-th entry are represented by D(i), T(i) and R(i), respectively. In this case, actual playback of samples is implemented in the order shown in FIG. 11(c). This will be briefly described.

First, since entry #1 defines that Track duration is 13000, Media time is 20000 and Media rate is 1 (FIG. 11(a)), the sample section from time 20000 to 33000 (=20000+13000) (FIG. 11(b)) is played back in the track section from the front to 13000 (FIG. 11(c)). Then, since entry #2 defines that Track duration is 5000 and Media time is −1 (FIG. 11(a)), no data is reproduced from the track section from time 13000 to 18000 (=13000+5000)(null in FIG. 11(c)).

Finally, since entry #3 defines that Track duration is 10000, Media time is 0 and Media rate is 1 (FIG. 11(a)), the sample section from time 0 to 10000 (FIG. 11(b)) is reproduced in the track section from time 18000 (=13000+5000) to 28000 (=18000+10000) (FIG. 11(c)).

FIG. 12 shows the structure of a User-defined data atom. This atom is able to store a desired number of pieces of free information that are not defined by the QuickTime format. A piece of free information is managed by one entry, which is composed of Size, Type and User data. Size indicates the size of the entry itself. Type is an ID information for distinguishing that free information from the others. User data represents actual data.

<Index File>

One special QuickTime movie file called AV index file is provided on the disk in order to manage QuickTime movies contained in the disk. Registered in the AV index file are thumbnails and various attributes concerning files (QuickTime movies, still images referred to by QuickTime movies, and others) in the disk.

One of the various attributes is Link count, which represents the number of times the file is referred to from without. Checking the Link count of a file facilitates the knowledge as to whether there is any file that refers to that file, so that it is possible to prevent accidental deletion of a file that is referred to from others.

EMBODIMENT 1

One embodiment of the present invention will be described with reference to FIGS. 13 to 21.

<AV Stream Structure>

The structure of an AV stream in the present invention will be described with reference to FIGS. 13 and 14. An AV stream is composed of an integer number of Record Units (RUs). A RU is a unit to be recorded continuously on the disk. The lengths of RUs are set up so as to guarantee seamless playback (the picture and sound during playback can be reproduced without a break) regardless of how the RUs that constitute the AV stream are allocated on the disk. This setup will be described later.

Further, the stream is constructed so that RU boundaries correspond to ECC block boundaries. Owing to these RU features, the arrangement of an AV stream after it has been recorded on the disk can be easily changed by the RU units while seamless playback is guaranteed.

A RU is composed of an integer number of Video Units (VUs). A VU is a unit that is reproducible by itself. Therefore, it is a possible entry point upon reproduction. FIG. 14 is the structure of a VU. A VU is composed of an integer number of GOPs (groups of pictures) storing video data of about one second long and an integer number of AAUs (Audio Access Units) storing main audio data to be reproduced in synchronism.

Here, GOP is a compression unit in MPEG-2 standard and is composed of a multiple number of video frames (typically, about 15 frames). AAU is a compression unit in MPEG-1 Layer II standard, and is composed of 1152 sample points of the sound waveform. When the sampling frequency is 48 kHz, the reproduction time per AAU is 0.024 second.

In VU, AAUs and GOPs are arranged in the order mentioned in order to lessen the necessary delay to assure AV synchronized reproduction. Further, in order to permit independent reproduction in UV units, a Sequence Header (SH) is allotted at the front of the video data in each VU.

The playback time of a VU is defined by the product between the number of video frames contained in the VU and the video frame period. When an integer number of VUs are put together into a RU, zeros are stuffed after the end of the VUs so that the start and end of the RU correspond to ECC block boundaries.

Figure 13:
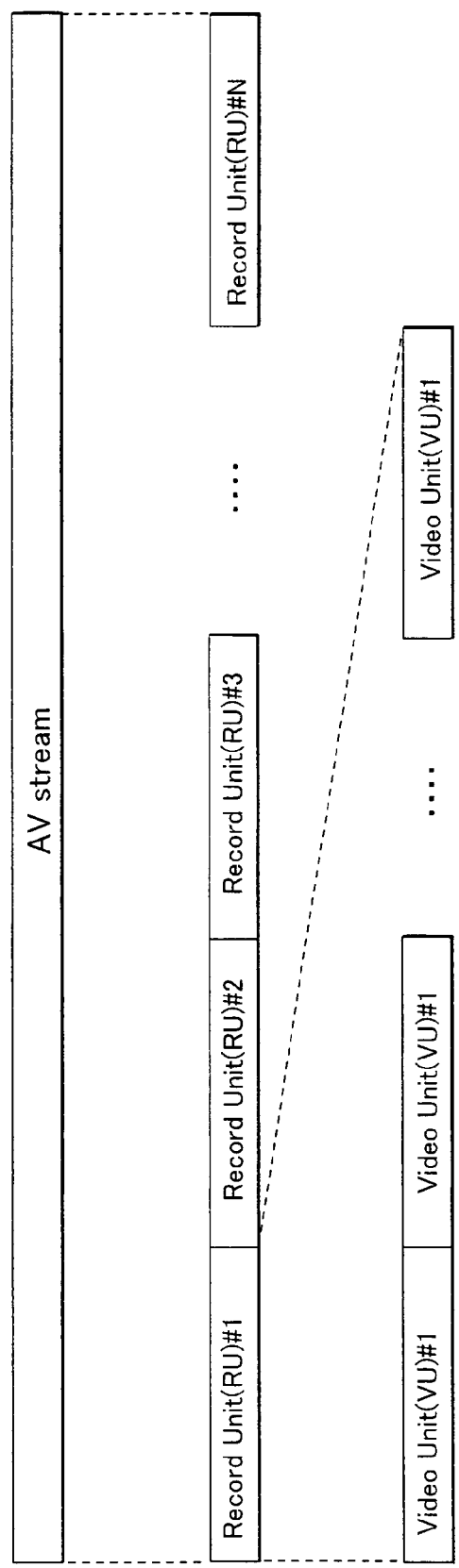
FIG. 13 is an illustrative view showing a stream structure in the first embodiment of the present invention.
Figure 14:
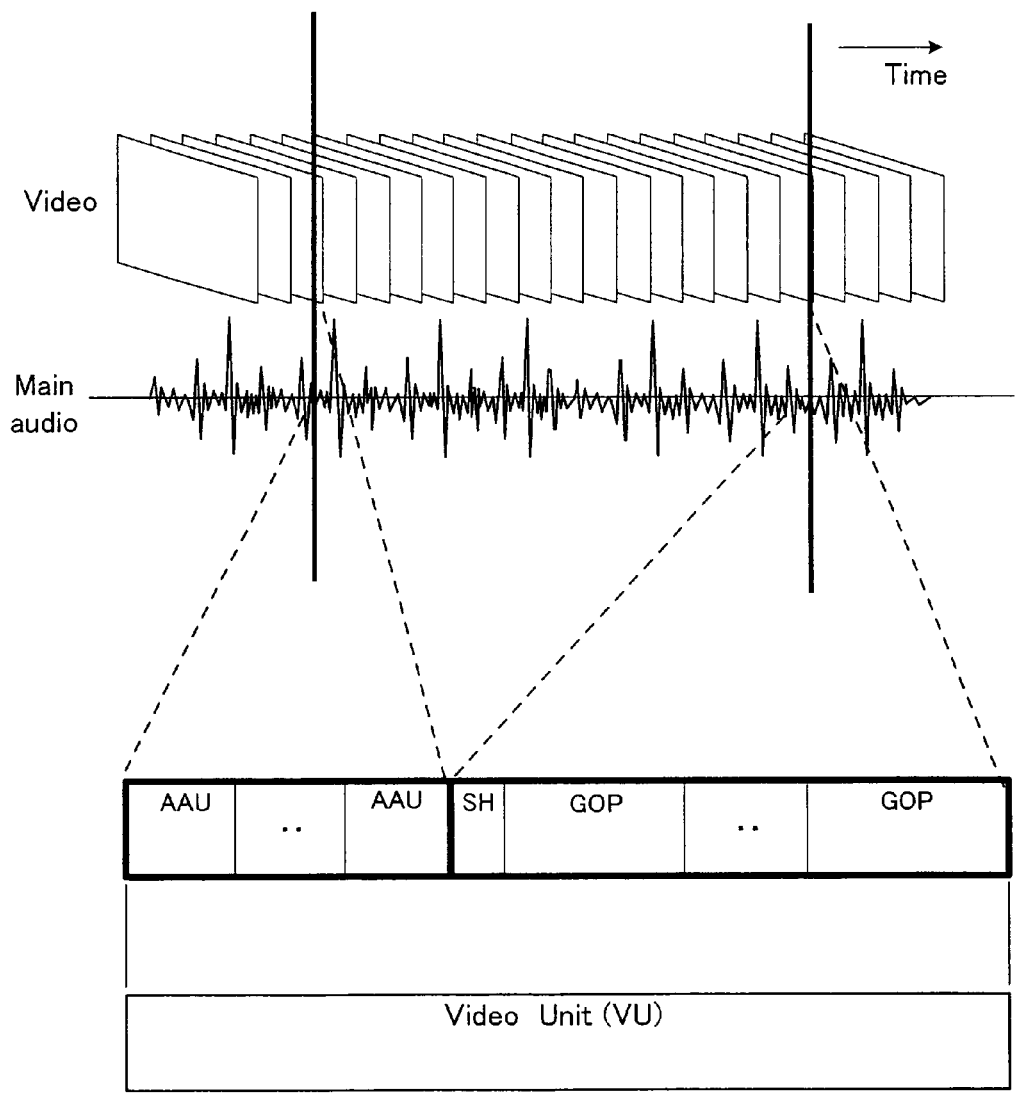
FIG. 14 is an illustrative view showing a VU structure in the first embodiment of the present invention.

In the present embodiment, the AV stream structure shown in FIGS. 13 and 14 is used for explanation, but the present invention should not be limited to this stream configuration.

<AV Stream Management Method>

Figure 15:
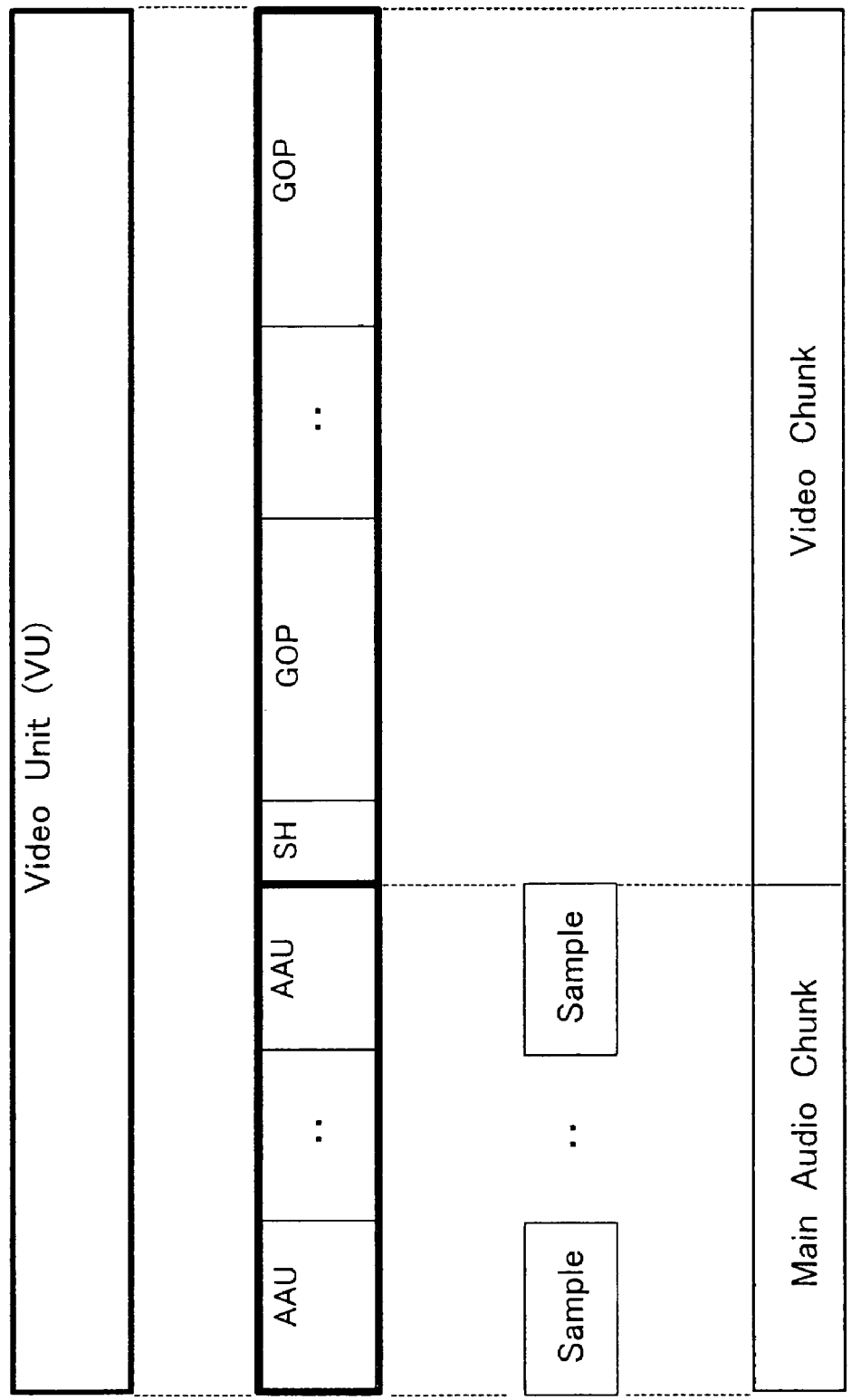
FIG. 15 is an illustrative view showing an AV stream management structure based on QuickTime in the first embodiment of the present invention.

The management method of AV streams is devised on the basis of the aforementioned QuickTime file format. FIG. 15 shows an AV stream management structure by QuickTime. AAU is given as a 'sample' of audio data, and Sequence header and the integer number of GOPs are given as a 'sample' of video data. The main audio and the video block in VU are each made corespondent to a single chunk.

<Determining Method of Allocation on Disk>

The determining method of allotting AV streams on the disk will be described. In order to guarantee seamless playback, the RU readout time including the time for jump to the next RU needs to be shorter than the playback time of a RU.

This means that Te(i), the RU playback time, satisfies the following relation:

$$Te(i) \geq Tr(i) \qquad <\text{Eq. 1}>$$

where Te(i) is the RU playback time, T(i) is the maximum playback time for an arbitrary RU in AV streams, namely RU#i, and Tr(i) is the maximum readout time including the time for discontinuous jump.

When Ra and Rv represent the maximum bit rates of the main audio and video in the AV streams, Ta represents the maximum access time of the playback device and Rs represents continuous readout rate, the following relation holds $$Tr(i) = Te(i) \times (Rv + Ra)/Rs + Ta \qquad <\text{Eq.2}>$$

From <Eq. 1> and <Eq. 2>, Te(i) should satisfy the following relation:

$$Te(i) \geq Ta \times Rs/(Rs - Rv - Ra) \qquad <\text{Eq. 3}>$$

Therefore, the minimum value Temin for the RU playback time to guarantee seamless playback is given as follows:

$$Temin = Ta \times Rs/(Rs - Rv - Ra) \qquad <\text{Eq. 4}>$$

<Process for Recording>

Figure 16:
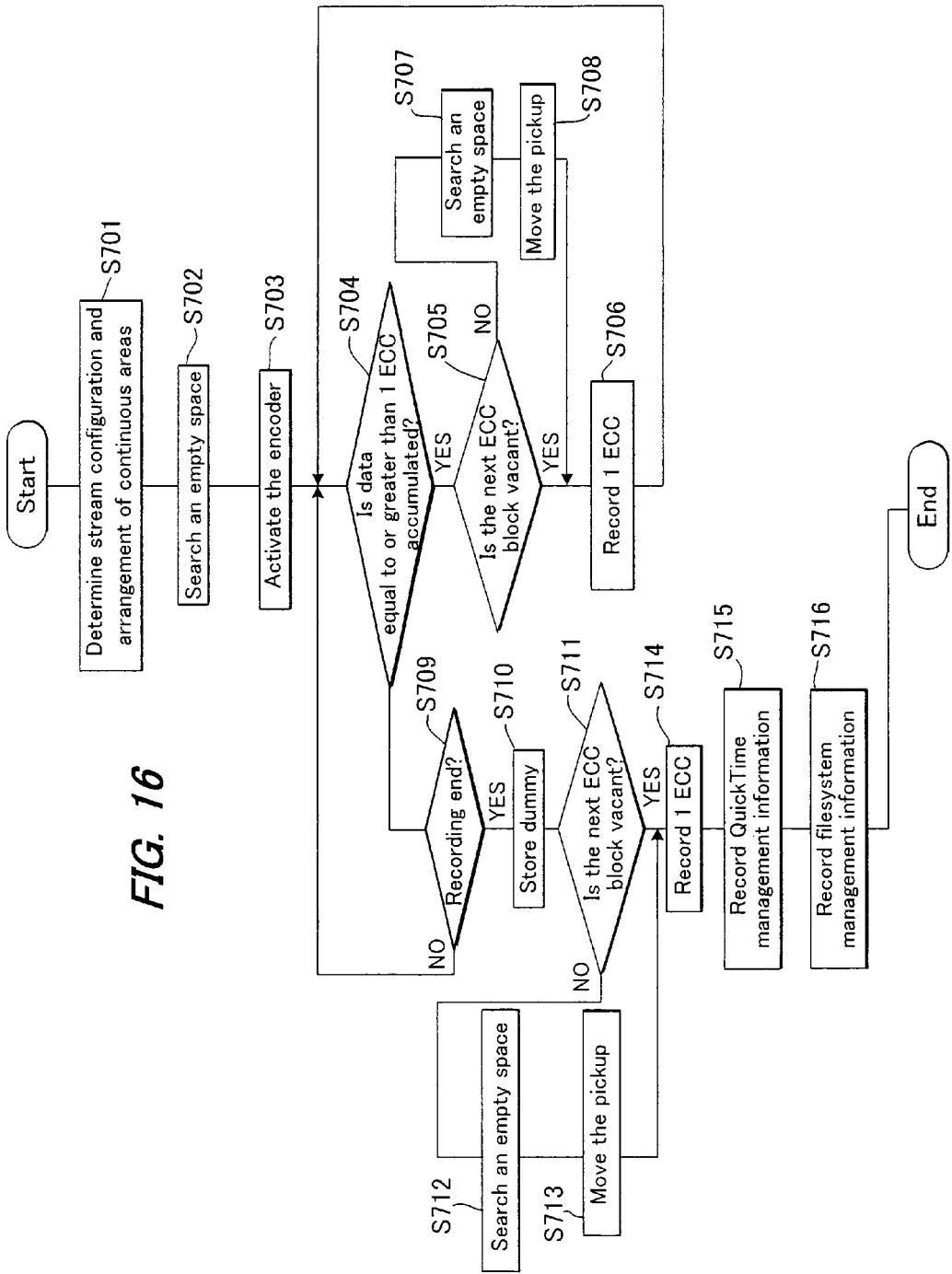
FIG. 16 is a flowchart showing the recording operation in the first embodiment of the present invention.

Referring to FIG. 16, the process when recording is commanded by the user will be described. In this case, it is assumed that the AV stream to be recorded has a video bit rate Rv=5 Mbps and an audio sampling frequency of 48 kHz with a bit rate Ra=Rp=256 kbps. It is also assumed that the management information of the filesystem has already been loaded into RAM.

To begin with, the stream configuration and the arrangement of continuous areas are determined (Step 701). When it is assumed that 1 VU is composed of 1 GOP=30 frames, as a result of substitution of Rs=20 Mbps, Ta=1 sec., Rv=5 Mbps and Ra=256 kbps into <Eq.4>, Te(i) is given to be equal to or greater than 1.36 sec. Since the playback time of 1 VU is 0.5 sec., the RU-playback time is set at 2 seconds.

Next, an empty area capable of recording two consecutive VUs should be searched for. Specifically, 2×(Rv+Ra), or a continuous empty area equal to or greater than 11 Mbits should be searched for with reference to Space Bitmap in RAM 102. If there is no such a space, the recording is stopped and failure of recording is informed to the user (Step 702).

Audio encoder 117 and video encoder 118 are activated (Step 703). Next, it is checked whether data in an amount equal to or greater than one ECC block (32 KB) is accumulated in the recording buffer (Step 704). While data accumulation is in progress, Steps 705 to 708 are repeated.

When data accumulation is completed, the status of vacancy of the next ECC block to which data is recorded on the disk is checked with reference to Space Bitmap in RAM (Step S705). If there is no vacancy, an empty area capable of recording two consecutive VUs is searched for (Step 707) and the pickup is moved to the front of that empty area (Step 708).

Next, data in the amount of one ECC block from recording buffer 111 is recorded into the disk (Step 706). If data has not been accumulated in recording buffer 111, it is checked whether a recording end command has been given (Step S709). When recording has not yet ended, Step 704 is executed.

When a recording end command has been given, the following steps are implemented. First, the data in the recording buffer, in an amount under 32 KB is added at its end with dummy data to reach 32 KB (Step 710). Next, the data is recorded onto the disk (Steps 711 to 714). Finally, the Quick-Time management information (Movie atom) in RAM 102 and the filesystem management information are recorded on optical disk 106 (Steps 715 to 716).

The operations of audio encoder 117, video encoder 118 and multiplexer 113 which operate in parallel with the above process will be described. Each of the encoders sends the encoded result to multiplexer 113 and the multiplexer stores these into multiplexing buffer 114.

When data amounting to 1 VU, or 1 GOP with AAUs to be reproduced in synchronism therewith are accumulated in multiplexing buffer 114, multiplexer 113 sends out data of 1 VL to recording buffer 111. Then, notice that data corresponding to 1 VU has been encoded is given to host CPU 101, host CPU 101 renews the QuickTime management information in RAM 102, based on the GOP that constitute the VU and the number and sizes of AUUs.

<Process for Editing>

A case where data in RU units is deleted from a portion partway within an AV stream will be considered. As already mentioned, the RU boundaries correspond to ECC block boundaries. Further, one ECC block is composed of 16 sectors, and one sector-corresponds to one logical block. Accordingly, it is possible to delete RU units of data by only rewriting the filesystem management information and the QuickTime management information.

As to the filesystem management information, those bits that correspond to the area to be deleted, in the aforementioned Space bitmap, are set at 0 to thereby release the area while the extents that manage the RUs to be deleted are rewritten. As to the QuickTime management information, the samples contained in the section to be deleted are deleted from the Sample table and the Chunk offset value of the chunk located after the section to be deleted is reduced by the number of bytes of the deleted section.

Further, with the reduction in playback time of each track due to deletion, Track duration of Edit list (FIGS. 10 and 11) should be shortened (FIGS. 10 and 11). By the above deletion, the resulting AV stream is formed so that the points right before and right after the deleted section are joined. At the same time, as to the video track, in order to demonstrate the seam, different entries are allotted before and after the point of time corresponding to the seam between the areas before and after the seam.

Figures 17, 18:
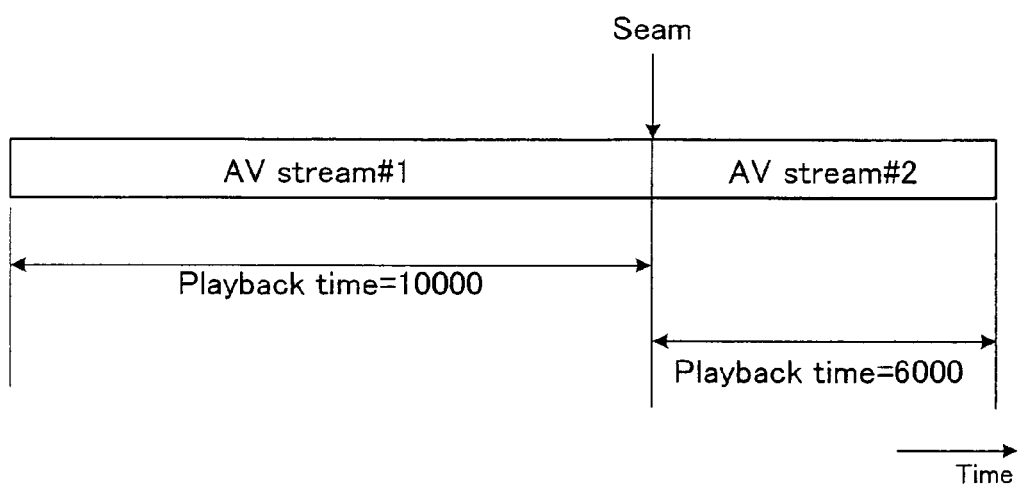
FIG. 17 is an illustrative view showing a joined state of AV streams in the first embodiment of the present invention.
FIG. 18 is an illustrative view-showing the first example of an information structure that manages the junction of AV streams in the first embodiment of the present invention.

For example, when AV streams #1 and #2 are joined so as to constitute an AV stream as shown in FIG. 17, Edit list atom (FIG. 10) is defined by two entries as shown in FIG. 18. Also, a case where AV streams are joined to one another in RU units can be also handled in a similar manner to that of deletion, i.e., by rewriting the filesystem management information and the QuickTime management information. From this information, the point of time at the seam along the track time axis and the address of the corresponding data of the time in the file can be known.

Though in the present embodiment, a case including one seam was described, it goes without saying that a case including two or more seams can be dealt with by only increasing the number of entries.

In the above case, the seam is made distinct by switching the entries in the Edit list of one track of video. However, any method can, of course, be used as long as it is possible to make distinct the possible sites that originate from the junction of AV streams and that may hinder decoding and reproduction. To cite one example, seams can be indicated by switching video tracks every seam.

Illustratively, in a case where AV streams shown in FIG. 17 are created by a joining process, the seam can be made distinct by managing the front half and the rear half using different tracks in such a manner that the contents of the Edit list atoms (FIG. 10) of the tracks that manage the front and rear halves are designated respectively as shown in FIGS. 19(*a*) and 19(*b*). In this case, in order to prevent accidental integration of the video tracks #1 and #2 after post editing, at least one value, specifically, Creation time (FIG. 5) or the like, is made different between video tracks #1 and #2.

Figure 20:
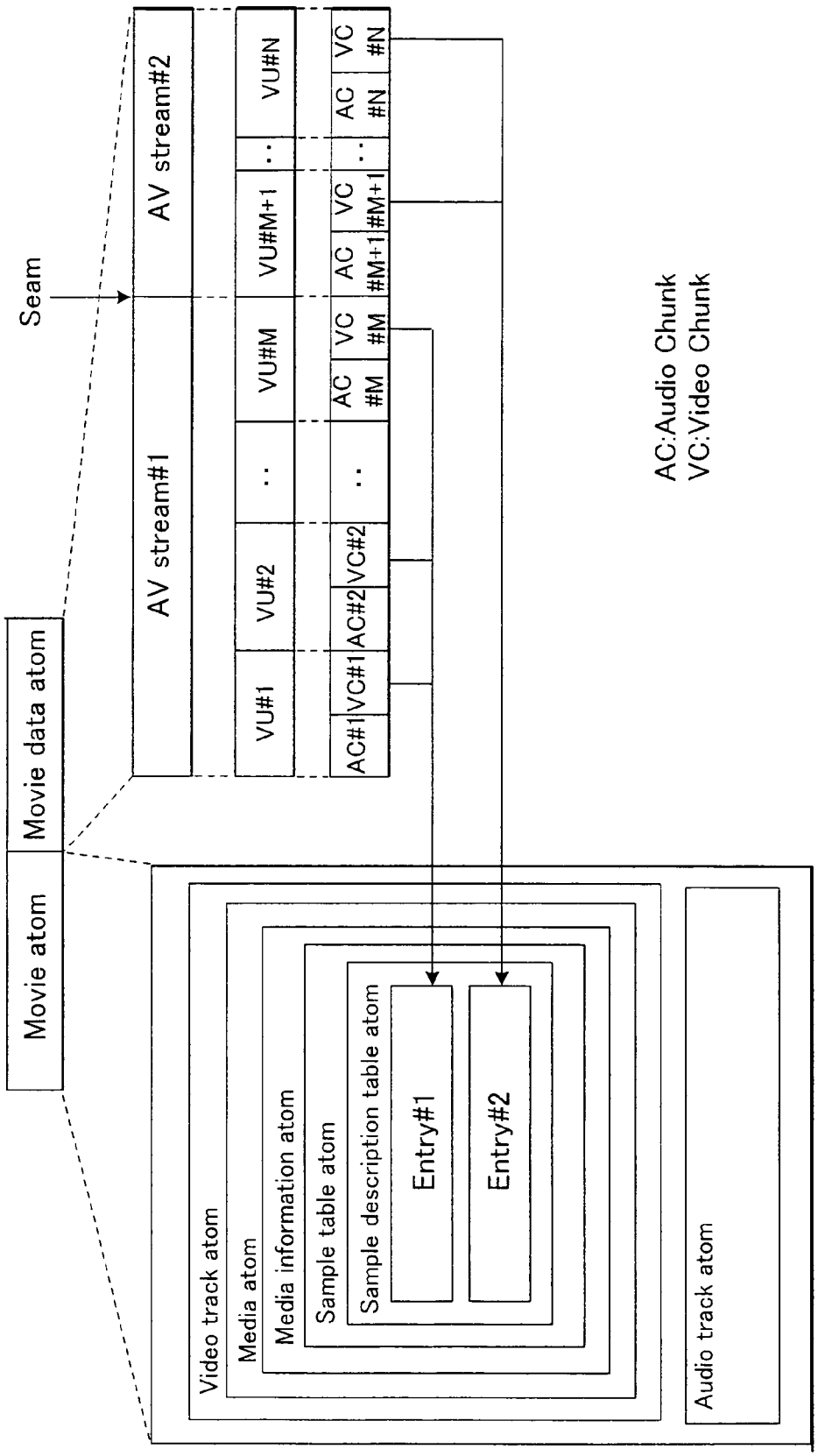
FIG. 20 is an illustrative view showing the third example of an information structure that manages the junction of AV streams in the first embodiment of the present invention.

Alternatively, the seam may be demonstrated by making the content of Sample description atom (FIG. 9) different between that before and after the seam. Specifically, in a case where AV streams shown in FIG. 17 are created by a joining process, the video data of the AV stream #1 and the video data of the AV stream #2 are adapted to refer to separate attributes represented by different entries #1 and #2 in Sample description atom, as shown in FIG. 20.

In this way, it is possible to show the seam. Further, by differentiating at least one value of each entry from that of the other in Sample description atom, it is possible to prevent the entries #1 and #2 from being accidentally merged when the Sample description table is optimized (plural entries having common content are integrated into one) at a later editing process.

<Process for Playback>

Figure 21:
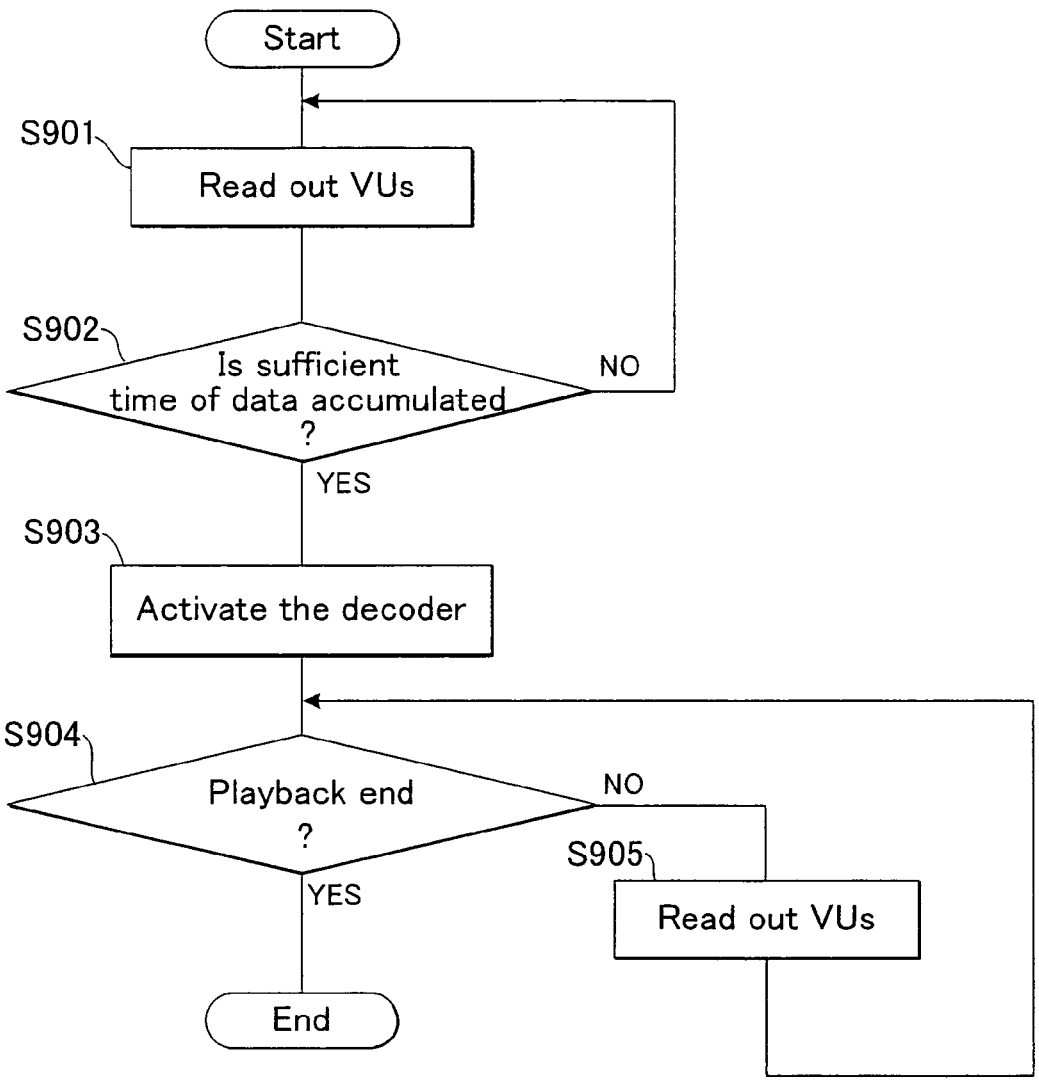
FIG. 21 is a flowchart showing the playback operation in the first embodiment of the present invention.
Figure 22:
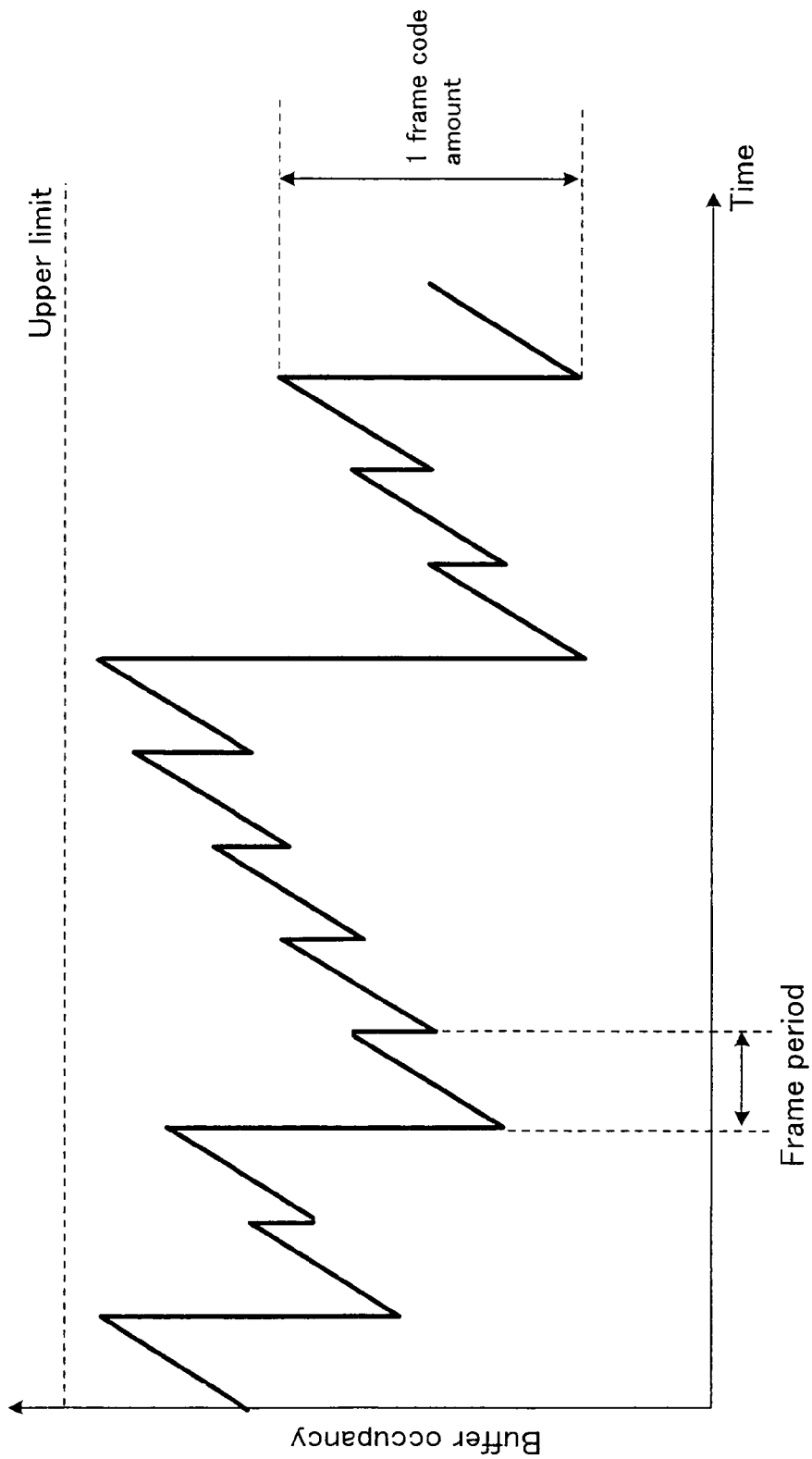
FIG. 22 is an illustrative view showing an example of change in the occupancy of the VBV buffer.

The process when a playback command is given from the user will be described with reference to FIG. 21. Here, it is assumed that the QuickTime management information on the AV stream to be reproduced has already been loaded into RAM 102.

Playback data starts being read from the front of a designated VU on optical disk 106 for playback (Step 901). This step 901 is repeated until a sufficient time of playback data has been loaded to playback buffer 110 (Step 902).

'A sufficient time of playback data' herein means the amount of data that will not cause any break during playback even when the maximum interruption occurs during readout of playback data. Specifically, the amount of data for 1 second is secured assuming that a discontinuous jump (maximum 1 second) entailing the readout of AV data is made.

Next, host CPU 101 activates video decoder 116 and audio decoder 115 (Step S903). Host CPU 101, based on the Quick-Time management information, gives a command to demultiplexer 112 so as to transfer the encoded data from playback buffer 110 to audio decoder 115 and video decoder 116.

Also, it is checked whether a playback end command has been given from the user (Step 904). If no command is given, playback AV data is read out (Step 905). If the playback end command has been given, the operation is ended.

When host CPU 101, based on system clock 105, detects that the current time reaches the time for switching the entries (FIG. 11) of Edit list atom (FIG. 10) of the video track, it determines that the site is a seam and halts the decoding operations by video decoder 116 and audio decoder 115. When change of the entries in Sample description table (FIG. 20) to which the video chunks refer is made use of to indicate a seam, the site at which change of the entries occurs is determined to be a seam.

Though the above operation causes the video frame right before the seam to be displayed (frozen) multiple times consecutively, no buffer underflow will occur because data can be accumulated into the decoder buffer for video decoder 116 during this period. Therefore, no reproduction noise will occur for some time, unlike the decoder buffer underflows. Further, since the video picture across a seam is inherently discontinuous, a freeze, if it occurs, will not cause noticeable noise compared to the same event at any other site.

Though in the present embodiment a single video decoder is used, a multiple number of video decoders may be used to make a switch at a seam. Specifically, the following operation is effected upon playback. Because the position of an actual seam in the AV data is known from the change of the entries in Edit list atom of the video track, the video data after the seam is sent to other video decoder than that used before the seam and starts being decoded so that the data can be displayed at any time. Then, when it reaches the point in time at which the entries of Edit list atom are switched, the video decoders are switched from that before the seam to that after the seam. In this case, since different decoders are used before and after the seam, no discontinuity of the occupancy of the VBV buffer will occur, and it is no longer necessary to freeze the display as in the case where only a single video decoder is used.

Though in the present embodiment the seams generated during editing are handled, the seams to be managed by the present invention are not limited to only those arising during editing. For example, when recording of a new AV stream is added after the end of an existing AV stream file, a discontinuity of the amount of occupancy of the VBV buffer occurs between the point before and after the point of addition. If the AV stream file is reproduced as is, there is a risk of noise occurring in decoding and reproduction right after the point of addition. Management of the point of addition in the same manner as in the present embodiment makes it possible to prevent such decoding and reproduction noise.

As has been described heretofore, according to the present invention, when multiple AV streams are put together into a single AV stream, the positional information of the seams are managed by the management information that manages the AV stream. Thereby it is possible to prevent the display from being disturbed around the seams when reproduced.

INDUSTRIAL APPLICABILITY

When AV streams of video data, audio data, etc., are recorded into a random accessible recording medium such as a hard disk, optical disk or the like and decoded therefrom, the invention is suitable for data recording, editing and decoding methods and a device thereof that can prevent playback data noise occurring between the AV streams.

The invention claimed is:

1. A decoding method for decoding an AV stream by using a management information, wherein,
   the AV stream is managed as one file containing AV data,
   a file system management information for managing the AV stream and the management information as respective files, has already been recorded onto a recording medium, and
   the management information contains a first entry information being defined to correspond to a first section that can be reproduced consecutively in the one file,
   the decoding method, comprising:
   decoding, in a decoder, an AV stream by using management information, the file system management information first rewritten so that a second section is deleted from a first section in the one file that already has been recorded onto a recording medium in order to join points right before and right after the deleted second section in the one file and then the management information rewritten so that a first entry and a second entry is allotted before and after the point of junction, respectively in order to indicate a point of junction in the AV stream; and halting decoding of the AV stream at the point of junction indicated by the management information, wherein the management information manages a sequence of a consecutive AV data in the AV stream as a basic unit for managing the one file.

2. A decoding device for decoding an AV stream by using a management, wherein, the AV stream is managed as one file containing AV data, a file system management information for managing the AV stream and the management information as respective files, has already been recorded onto a recording medium, and the management information contains a first entry information being defined to correspond to a first section that can be reproduced consecutively in the one file, the decoding device, comprising a decoding portion for decoding an AV stream; and a processor configured to control the decoding in the decoding portion based on a management information, the file system management information first rewritten so that a second section is deleted from a first section in the one file that already has been recorded onto a recording medium in order to join points right before and right after the deleted second section in the one file and then the management information rewritten so that a first entry and a second entry is allotted before and after the point of junction, respectively in order to indicate a point of junction in the AV stream, wherein the management information manages a sequence of a consecutive AV data in the AV stream as a basic unit for managing the one file, and wherein decoding of the AV stream is halted at the point of junction based on the information of the point of junction.

\* \* \* \* \*